(12) United States Patent
Spinazola, III et al.

(10) Patent No.: US 10,705,033 B2
(45) Date of Patent: Jul. 7, 2020

(54) SAMPLE HANDLING APPARATUS FOR PRESSURIZED FLUIDS AND X-RAY ANALYZER APPLICATIONS THEREOF

(71) Applicant: X-RAY OPTICAL SYSTEMS, INC., East Greenbush, NY (US)

(72) Inventors: Joseph J Spinazola, III, Troy, NY (US); Jay Burdett, Charlton, NY (US); Zewu Chen, Schenectady, NY (US); Daniel Dunham, West Sand Lake, NY (US)

(73) Assignee: X-RAY OPTICAL SYSTEMS, INC., East Greenbush, NY (US)

( * ) Notice: Subject to any disclaimer, the term of this patent is extended or adjusted under 35 U.S.C. 154(b) by 0 days.

(21) Appl. No.: 16/085,306

(22) PCT Filed: Mar. 13, 2017

(86) PCT No.: PCT/US2017/022077
§ 371 (c)(1),
(2) Date: Sep. 14, 2018

(87) PCT Pub. No.: WO2017/160705
PCT Pub. Date: Sep. 21, 2017

(65) Prior Publication Data
US 2019/0056337 A1   Feb. 21, 2019

Related U.S. Application Data

(60) Provisional application No. 62/307,752, filed on Mar. 14, 2016.

(51) Int. Cl.
*G01N 23/2204* (2018.01)
*G01N 23/20041* (2018.01)
*G01N 23/223* (2006.01)

(52) U.S. Cl.
CPC ... *G01N 23/2204* (2013.01); *G01N 23/20041* (2013.01); *G01N 23/223* (2013.01); *G01N 2223/076* (2013.01); *G01N 2223/637* (2013.01)

(58) Field of Classification Search
CPC ....... G01N 2223/076; G01N 2223/637; G01N 23/20041; G01N 23/2204; G01N 23/223
See application file for complete search history.

(56) References Cited

U.S. PATENT DOCUMENTS 7,331,714 B2   2/2008   Shu et al.
2009/0213988 A1   8/2009   Chen et al.
(Continued)

FOREIGN PATENT DOCUMENTS

EP   2284524   1/2014

OTHER PUBLICATIONS

International Search Report, dated Jun. 13. 2017, pp. 3.
International Searching Authority, Written Opinion of the International Searching Authority dated Jun. 13, 2017, pp. 8.

*Primary Examiner* — Dani Fox
(74) *Attorney, Agent, or Firm* — Kevin P. Radigan, Esq.; Heslin Rothenberg Farley & Mesiti P.C.

(57) ABSTRACT

A sample handling apparatus/technique/method for a material analyze including a sample carrier for presenting a pressurized sample (e.g., LPG) to a sample focal area of the analyzer; a removable fixture for charging the pressurized sample into the sample carrier; the removable fixture including at least one port to provide sample to and from the fixture and carrier. The sample handling apparatus may include a retainer, wherein the sample carrier is removeably combined with the fixture using the retainer, the apparatus being insertable into the analyzer for sample analysis; and wherein the retainer includes an aperture for presenting the sample to (Continued)

the focal area from a filmed, lower end of the carrier in proximity therewith.

15 Claims, 11 Drawing Sheets

(56) References Cited

U.S. PATENT DOCUMENTS

2013/0044858 A1* 2/2013 Allen .................. G01N 23/223
378/44
2014/0198898 A1 7/2014 Beumer et al.
2016/0033428 A1 2/2016 Allen et al.

* cited by examiner

SAMPLE HANDLING APPARATUS FOR PRESSURIZED FLUIDS AND X-RAY ANALYZER APPLICATIONS THEREOF

CROSS-REFERENCE TO RELATED APPLICATION

This application claims the benefit of U.S. provisional patent application Ser. No. 62/307,752, filed Mar. 14, 2016, which is hereby incorporated herein by reference in its entirety.

TECHNICAL FIELD

This invention relates in general to apparatus and methods used for analysis of samples. More particularly, the present invention is directed to a sample cell and handling apparatus for pressurized fluids and x-ray analyzer applications thereof, adapted for Liquefied Petroleum Gas ("LPG") applications.

BACKGROUND OF THE INVENTION

X-ray analysis of samples is a growing area of interest across many industries such as consumer products, medical, pharmaceutical, and petroleum. The use of x-ray fluorescence, x-ray diffraction, x-ray spectroscopy, x-ray imaging, and other x-ray analysis techniques has led to a profound increase in knowledge in virtually all scientific fields.

X-ray fluorescence (XRF) is an analytical technique by which a substance is exposed to a beam of x-rays to determine, for example, the presence of certain components. In XRF, at least some of the elemental constituents of the substance exposed to x-rays can absorb x-ray photons and produce characteristic secondary fluorescence. These secondary x-rays are characteristic of the elemental constituents in the substance. Upon appropriate detection and analysis these secondary x-rays can be used to characterize one or more of the elemental constituents. XRF techniques have broad applications in many chemical and material science fields, including industrial, medical, semiconductor chip evaluation, petroleum, and forensics, among others.

As some examples of measurements required in the petroleum industry, trace levels of contaminants in petroleum feedstocks is a notorious problem in petroleum refining. Sulfur is a common component in crude oil streams— and its removal from final product is mandated due to its impact on the environment, as regulated by the US EPA under the Clean Air Act. Sulfur is harmful to the environment, and the cost of its removal is high. Therefore, monitoring sulfur levels early in the refining process is important. Chlorine and vanadium contaminants are considered "bad actors" by the refining industry for primarily non-regulatory, process control reasons. Chlorides also pose one of the greatest problems to the refining industry. According to a 2005 paper by The National Association of Corrosion Engineers ("NACE"): "Recently, an increasing number of refineries have experienced extreme corrosion and fouling in crude distillation unit overheads and/or naphtha hydrotreating units. The root causes were traced to severe spikes in the chloride levels."

U.S. Pat. Nos. 6,934,359 and 7,072,439, hereby incorporated by reference herein in their entirety and assigned to X-Ray Optical Systems, Inc., the assignee of the present invention, disclose monochromatic wavelength dispersive x-ray fluorescence (MWD XRF) techniques and systems for the analysis of liquid samples.

As one particular example of a measurement system for such contaminants, the above-incorporated patents disclose techniques for the determination of the level of elements in petroleum fuels, and commercialized analyzers (e.g., SINDIE and CLORA) are now in widespread use for, e.g., sulfur and chlorine measurement at petroleum refining, pipeline, and/or terminal facilities.

XRF testing can take place off-line, i.e., using a benchtop, laboratory-type instrument to analyze a sample. In contrast to off-line analysis, on-line analysis provides "real-time" monitoring of sample composition at various points in the manufacturing process.

In either analyzer, for liquified petroleum gas (LPG) applications, fluids under particularly high pressure must be presented to the analyzer at a stable pressure. These "liquified gas" applications required the liquid to stay under pressure, e.g., 200-200 PSI, when presented to the analyzer.

What is required, therefore, are sample handling techniques and apparatuses for analysis systems handling high pressure, liquified samples, which provide analyte measurement results.

SUMMARY OF THE INVENTION

The shortcomings of the prior art are overcome and additional advantages are provided by the present invention which in one aspect is a sample handling apparatus/technique/method for a material analyze including a sample carrier for presenting a pressurized sample to a sample focal area of the analyzer; a removable fixture for charging the pressurized sample into the sample carrier; the removable fixture including at least one port to provide sample to and from the fixture and carrier.

The sample handling apparatus may include a retainer, wherein the sample carrier is removeably combined with the fixture using the retainer, the apparatus being insertable into the analyzer for sample analysis; and wherein the retainer includes an aperture for presenting the sample to the focal area from a filmed, lower end of the carrier in proximity therewith.

The sample handling apparatus may be used in combination with an x-ray analyzer, the x-ray analyzer including an x-ray engine with an x-ray excitation path and an x-ray detection path, wherein the x-ray excitation and/or the x-ray detection path defines the sample focal area.

The focal area may be a focal point, defined by focused x-rays to/from at least one focusing optic in the x-ray excitation path and/or the x-ray detection path. The focusing optic may be a curved diffracting optic or a polycapillary optic.

The system may comprise a monochromatic wavelength-enabled XRF analyzer; e.g., an MWDXRF or ME-EDXRF analyzer.

The sample may comprise a low or high viscosity petroleum-based product requiring the measurement of an analyte therein, e.g., one or more elements chosen from the following list: S, Cl, P, K, Ca, V, Mn, Fe, Co, Ni, Cu, Zn, Hg, As, Pb, and Se.

Further, additional features and advantages are realized by the techniques of the present invention. Other embodiments and aspects of the invention are described in detail herein and are considered a part of the claimed invention.

BRIEF DESCRIPTION OF THE DRAWINGS

The subject matter regarded as the invention is particularly pointed out and distinctly claimed in the claims at the conclusion of the specification. The foregoing and other objects, features, and advantages of the invention are apparent from the following detailed description taken in combination with the accompanying drawings (where like elements are designated with like numerals) in which:

DETAILED DESCRIPTION OF THE INVENTION

Figure 1:
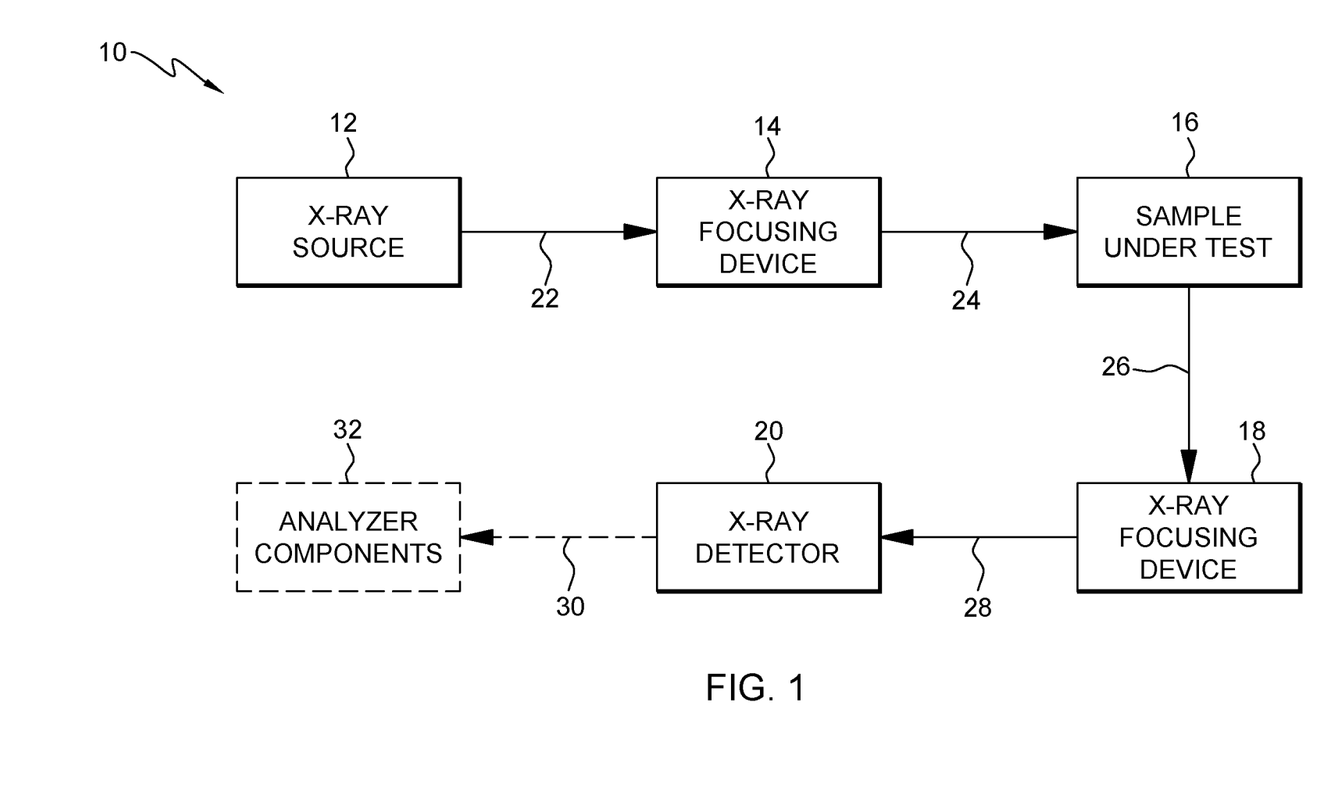
FIG. 1 is a functional block diagram of the elements of an exemplary x-ray fluorescence system.

FIG. 1 is a functional block diagram of an exemplary XRF system 10 used for exposing a sample to x-ray radiation to produce fluorescent radiation which can then be detected and analyzed to determine a characteristic of the sample. The system may include an x-ray source 12, a first x-ray focusing device 14, a sample under test 16, a second x-ray focusing device 18, an x-ray detector 20, and an analyzer components 32 for providing the analytical result. The x-ray source 12, for example, an x-ray tube, produces a beam of x-rays 22. Beam 22 may diffracted or focused by one or more x-ray focusing optics 14 as discussed further below.

When irradiated by beam 24, at least one of the constituents of sample in chamber 16 is excited in such a fashion that the constituent fluoresces, that is, produces a secondary source of x-rays 26 due to excitation by x-rays 24. Again, since x-ray beam 26 is typically a diverging beam of x-rays, beam 26 may be focused by the second x-ray focusing optics 18, for example, to produce a focused beam of x-rays 28 directed toward x-ray detector 20.

X-ray detector 20 may be a proportional counter-type or a semiconductor type x-ray detector (e.g., silicon drift detector), or any other suitable type of x-ray fluorescence detector known to one skilled in the art. Typically, x-ray detector 20 produces an electrical signal 30 containing a characteristic of the detected x-rays which is forwarded to an analyzer components 32 for analysis, printout, or other display.

X-ray focusing devices/optics 14, 18 for advanced XRF systems, including those below, may include, for example, curved crystal monochromating optics such as those disclosed in commonly assigned U.S. Pat. Nos. 6,285,506; 6,317,483; 7,035,374 and 7,738,629; and/or polycapillary optics such as those disclosed in commonly assigned U.S. Pat. Nos. 5,192,869; 5,175,755; 5,497,008; 5,745,547; 5,570,408; and 5,604,353. Optic/source combinations such as those disclosed in commonly assigned U.S. Pat. Nos. 7,110,506; 7,209,545; and 7,257,193 are also useable. Each of the above-noted patents is hereby incorporated herein by reference in its entirety.

The following are two examples of x-ray-optic-enabled analyzer engines which may be used in connection with the present invention:

Exemplary MWD XRF X-Ray Analysis Engines:

The assignee of the present invention has previously disclosed a Monochromatic Wavelength Dispersive X-ray Fluorescence (MWD XRF) analyzer 120 using two monochromating optic sets (U.S. Pat. Nos. 6,934,359 and 7,072,439—hereby incorporated by reference herein in their entireties), as shown schematically in FIG. 2. The related SINDIE (Sulfur IN DIEsel) and CLORA (chlorine) product lines for the measurement of e.g., sulfur and chlorine in diesel fuel and other petroleum products revolutionized XRF and provide many advantages including: (1) signal/background (S/B) is improved due to monochromatic excitation of the sample by DCC1 14', i.e., the bremsstrahlung photons with energies under fluorescence peaks (which normally swamp these peaks of interest) can only reach the detector through scattering, therefore improving the S/B ratio dramatically compared to polychromatic excitation; (2) superior energy resolution—this eliminates all common interference problems and provides the physical basis for upstream applications; (3) inherent robustness and low maintenance— the analysis engine is low power, compact, with no moving parts or consumable gasses; and (4) unprecedented dynamic range, e.g., a quantification level from 0.3 ppm to 5% of sulfur in a sample.

Figure 2:
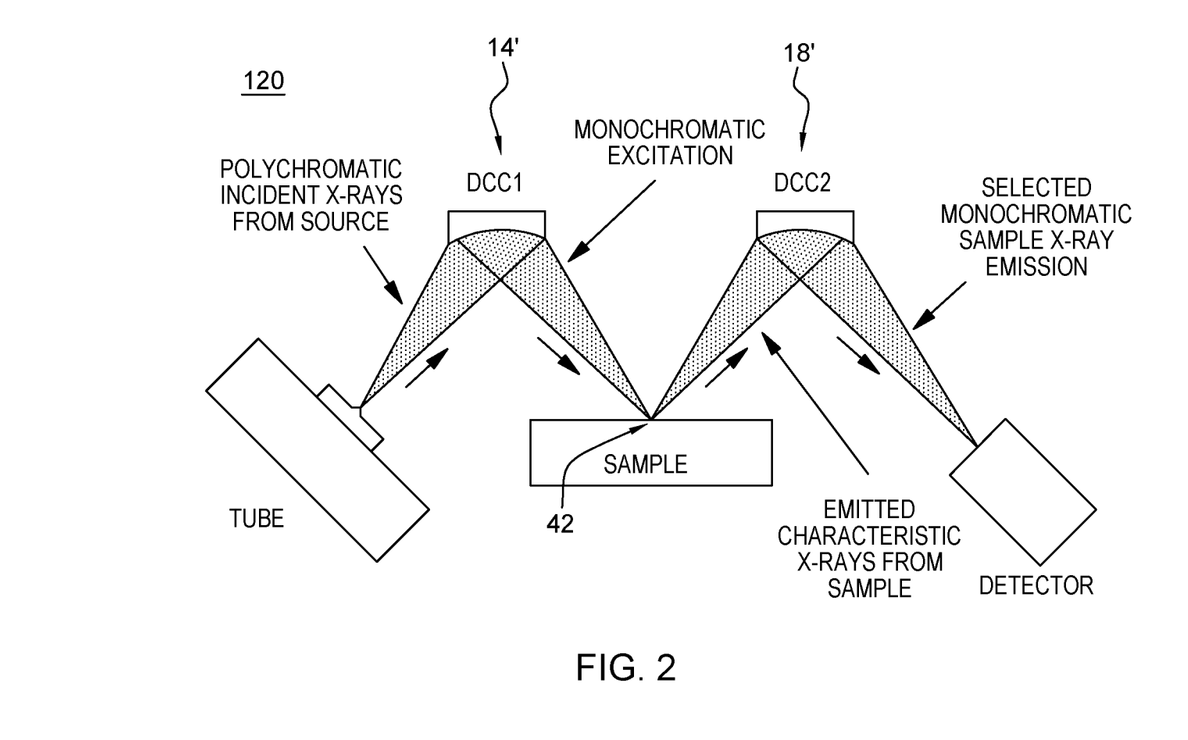
FIG. 2 is a schematic view of an exemplary MWD XRF x-ray engine useable with the sample handling apparatus of the present invention.

The MWD XRF engine 120, shown schematically in FIG. 2, includes curved monochromating optics 14' and 18' in the excitation and detection paths respectively, forming focal area or point 42 on the sample (discussed further below), which is the configuration of the SINDIE sulfur analyzer discussed above. However, an optic may only be present in one of these paths, which still requires precise alignment. In one example, an optic of any of the above-describe types may only be present in the excitation path, and the detection path would include an energy dispersive detector. This is the common configuration of an energy dispersive x-ray fluorescence (EDXRF) system, discussed further below.

Figure 3:
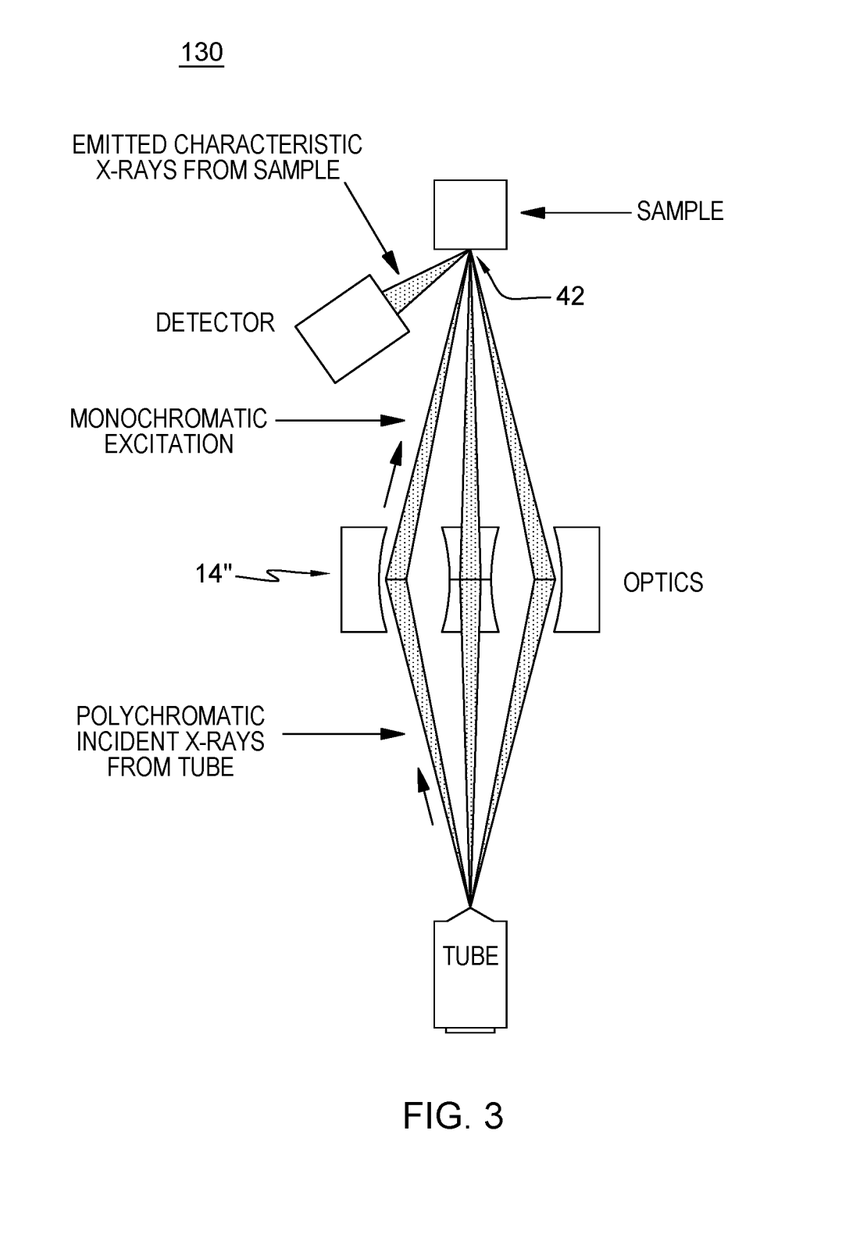
FIG. 3 is a schematic view of an exemplary ME EDXRF x-ray engine useable with the sample handling apparatus of the present invention.

Exemplary ME EDXRF X-Ray Analysis Engine:

Monochromatic excitation, energy dispersive x-ray fluorescence (ME-EDXRF) analyzers can also be used for this application, in accordance with the present invention. The engine technology is disclosed in, e.g., commonly assigned U.S. Patent Publication 2011/0170666 A1, and in PCT Publication No. WO 2009/111454 A1, entitled "XRF System Having Multiple Excitation Energy Bands in Highly Aligned Package", the entireties of which are hereby incorporated by reference herein. In one embodiment this engine 130 involves monochromatic excitation known as HD XRF as depicted schematically in FIG. 3. HD XRF is a multi-element analysis technique offering significantly enhanced detection performance over traditional ED or WD XRF. This technique applies state-of-the-art monochromating and focusing optics 14" illuminating a focal area or point 42 on the sample, enabling multiple select-energy excitation beams that efficiently excite a broad range of target elements in the sample. Monochromatic excitation dramatically reduces scattering background under the fluorescence peaks, greatly enhancing elemental detection limits and precision.

Figure 4:
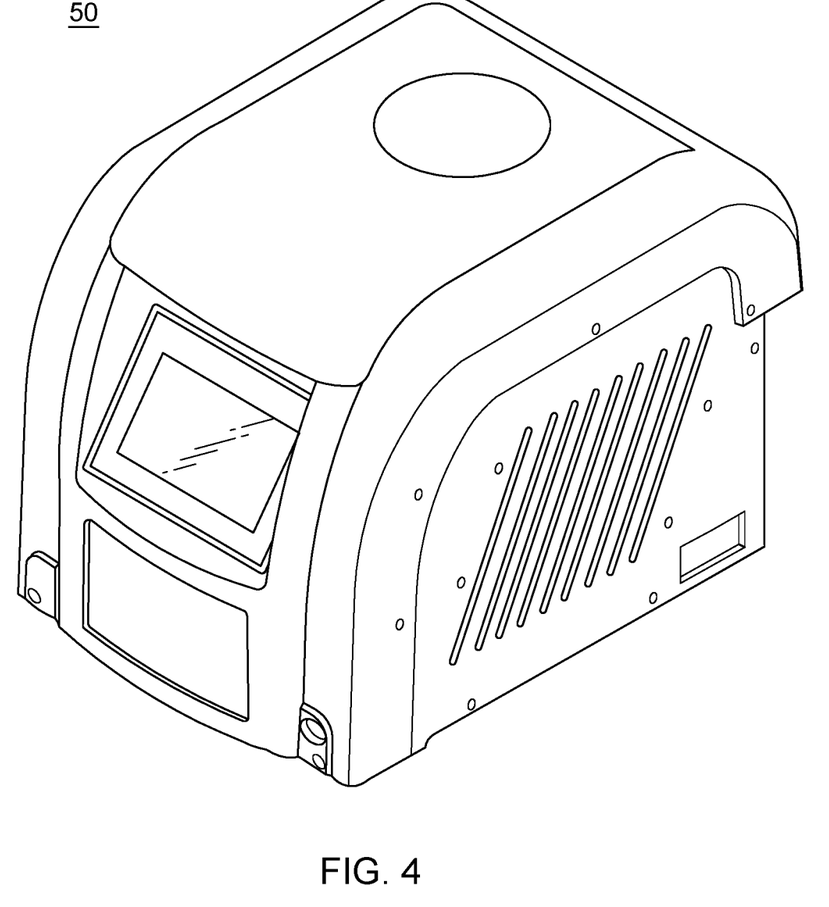
FIG. 4 is a perspective views of a typical bench-top x-ray analyzer including the sample handling apparatus of the present invention.

FIG. 4 is a perspective view of a typical bench-top x-ray analyzer 50 useable in connection with either of the engines above, or other analytical engines, and in combination with the sample handling apparatus of the present invention as discussed further below.

Figures 5A, 5B:
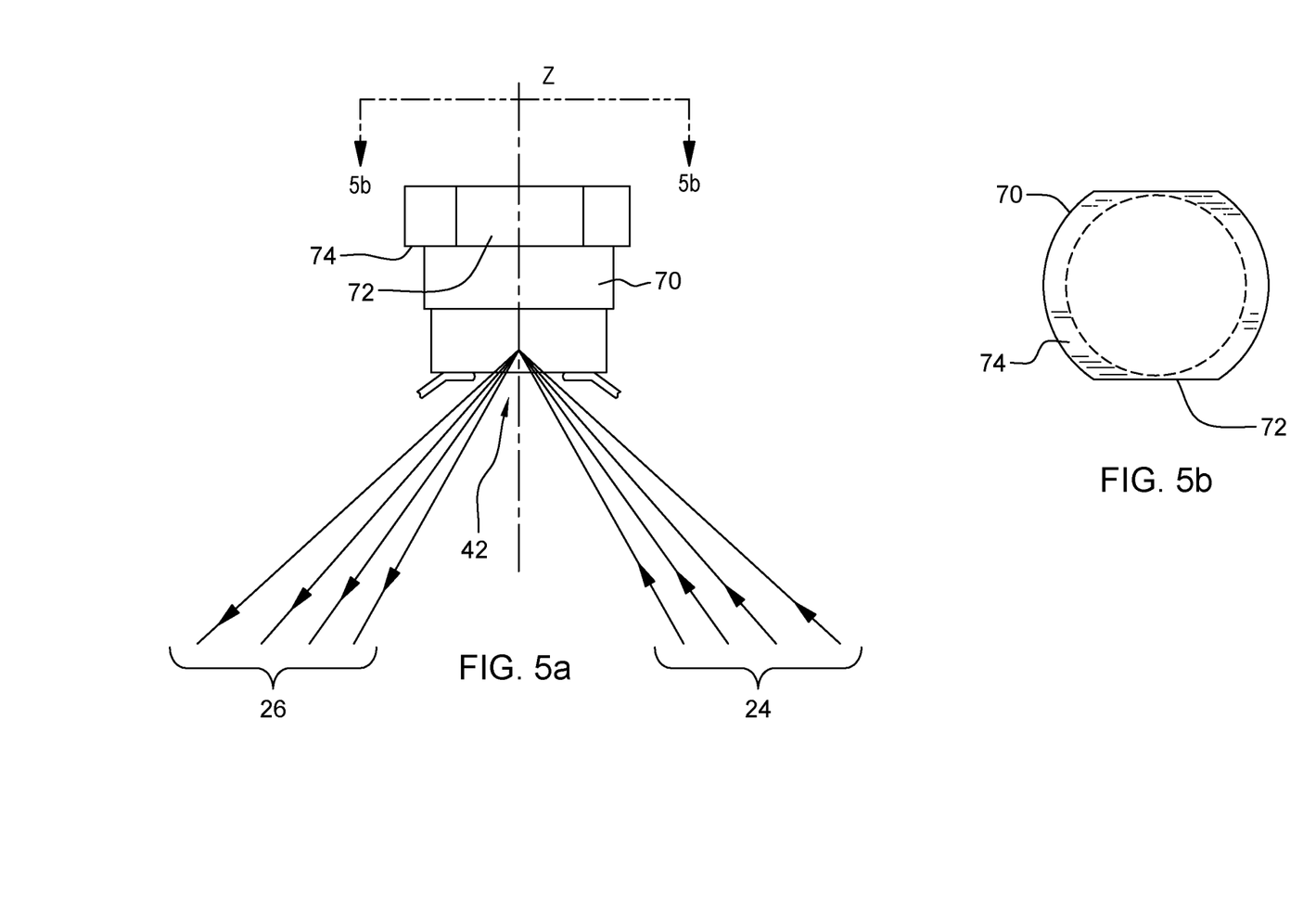
FIGS. 5a-b are side and top views of a particular sample cell serving as a precedent to the sample handling apparatus of the present invention.

FIGS. 5a-b are side and top views of an exemplary sample cell useable in such an analyzer, serving as a precedent to the sample handling apparatus of the present invention.

As disclosed in commonly assigned U.S. Pat. No. 7,729,471, the entirety of which is incorporated herein by reference, this sample cell may be a pre-filmed, precision sample cell 70. The sample cell includes an outer body forming an interior sample reservoir, the top end of which accepts a sample, and the bottom end of which may be pre-filmed for accepting input 24 and output 26 x-ray beams when placed in an analyzer, e.g., analyzer 50 of FIGS. 4 and 6. As discussed above, sample focal area or point 42 is formed by these beams.

This lower end of the interior sample reservoir may be formed of a film (e.g., mylar) which can be wrapped tightly around the lower ends of the body, and held in place using a conformal ring. Other attachment techniques are possible, including glues, ultrasonic, RF, or other heating techniques to create a bond between the film and the body around the perimeter of the lower end. The film is preferably designed with enough strength to hold the sample (and, as discussed further below, with enough strength to support the entire sample cell in the instrument), while allowing penetration of x-rays, and resultant x-ray fluorescence from/to the x-ray analysis engine. The sample can be a liquid sample, a partially-liquid sample, or a solid (e.g., powder) sample.

Other features include opposing horizontal edges 74 which can assist/control the vertical placement of the cell in an x-ray analysis engine, and opposing faces 72 which can also be used to assist/control the horizontal/rotational placement of the cell. In accordance with the present invention, similar edges 74 and faces 72 can assist in attachment and removal of the sample cell insert of the present invention, as discussed further below.

Figure 6:
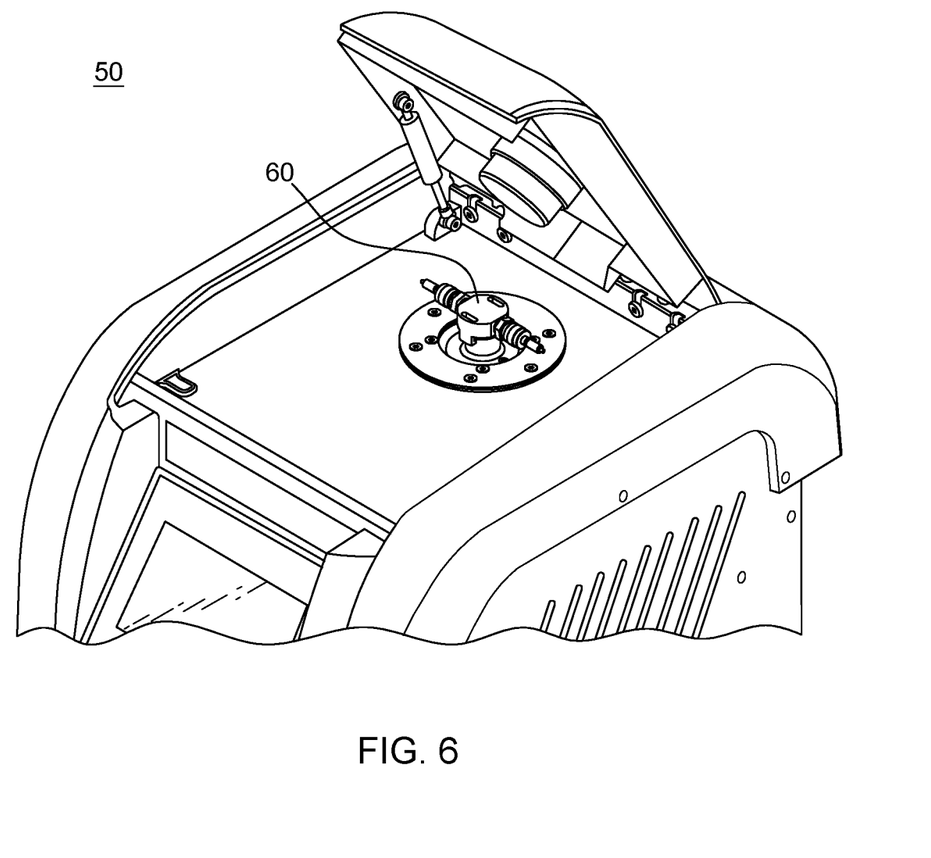
FIG. 6 is a perspective view of the sample handling apparatus in accordance with one aspect of the present invention implemented in an exemplary bench-top analyzer.

FIG. 6 is a perspective view of a sample handling apparatus 60 in accordance with one aspect of the present invention, mounted in an exemplary bench-top analyzer 50. Sample handling apparatus 60 is mounted inside the access door of analyzer 50 and over the sample chamber. In accordance with the present invention, apparatus 60 includes a fully charged sample of, e.g., liquified petroleum gas (LPG) under pressure, possibly 200-300 psi, including but not limited to liquified natural gas (LNG), liquified propane, liquified butane, etc. The present invention advantageously supplements a standard bench-top analyzer 50 with a handling apparatus 60 specially designed to handle highly pressurized samples.

Figure 7:
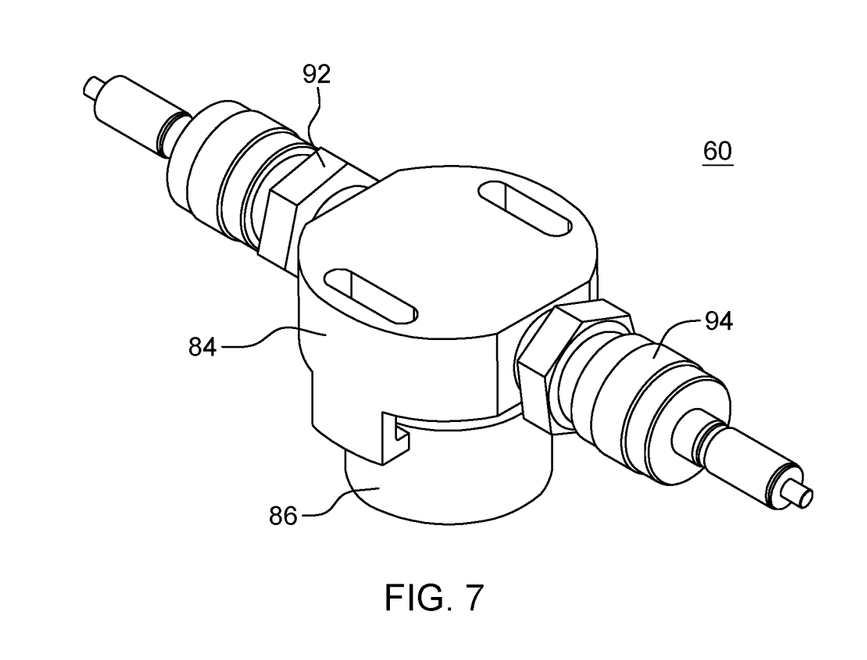
FIG. 7 is a perspective view of the sample handling apparatus in accordance with one aspect of the present invention.

FIG. 7 shows apparatus 60 which includes a charging fixture 84, a removable window carrier 85, and retainer 86.

Figure 8:
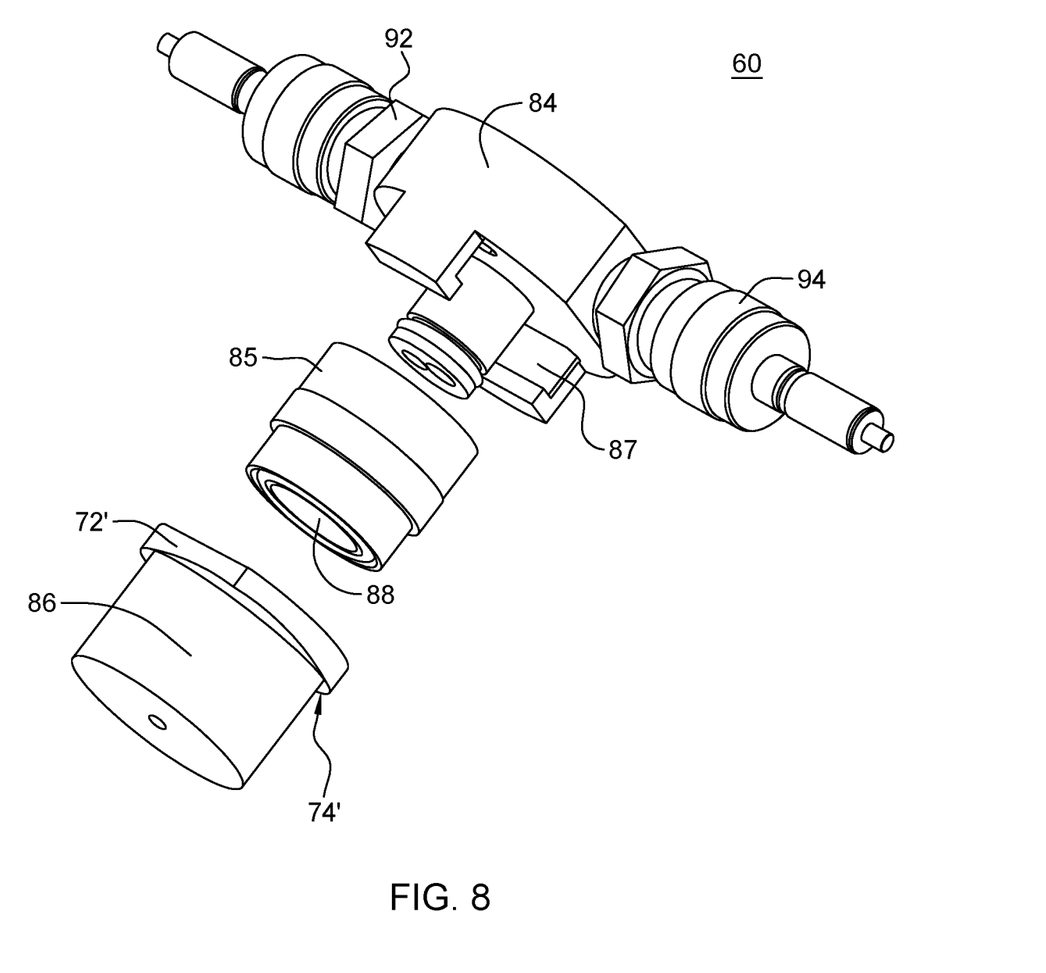
FIG. 8 is an exploded view of the sample handling apparatus in accordance with one aspect of the present invention.

FIG. 8 is an exploded view of the sample handling apparatus in accordance with one aspect of the present invention, showing additional detail of carrier 85—i.e., a film 88 disposed over the lower edge of the carrier. This film, discussed further below, will assist in presenting the sample to the analyzer focal spot through an aperture in the lower end of the retainer 86. Carrier 85 may be single use, and "pre-filmed" prior to shipment from its factory.

Figure 9A:
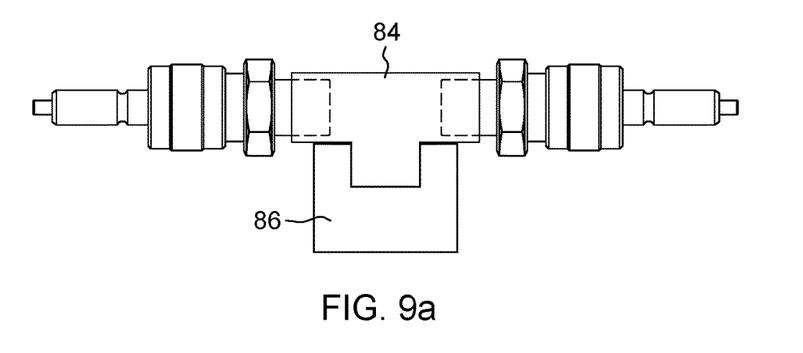
FIGS. 9a-c are front, front cross-sectional, and bottom views of the sample handling apparatus in accordance with one aspect of the present invention.
Figure 9B:
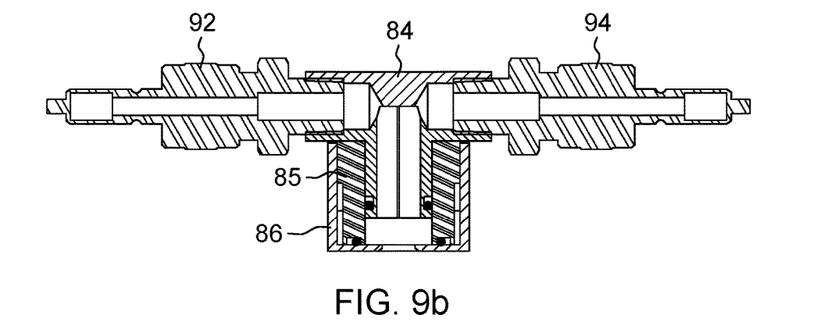
Figure 9C:
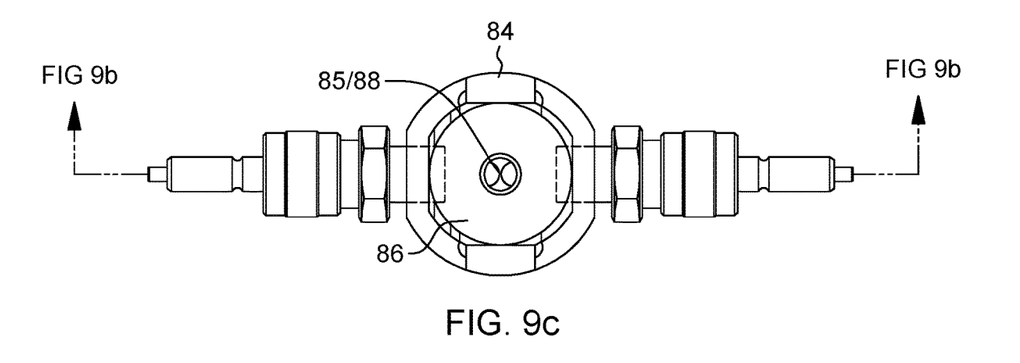

FIGS. 9a-c are further, front, front cross-sectional, and bottom views of the sample handling apparatus 60 in accordance with one aspect of the present invention.

Charging fixture includes, in one aspect, quick-connect, sealing ports 92 and 94 for providing pressurized sample to/from the apparatus. They may also carry discharged sample and/or purged gases.

Fixture 84 is adapted to closeably affix to retainer 86, effectively sealing the window carrier 85 between fixture 84 and retainer 86—allowing sample to be charged into the apparatus.

"Arms" 87 of fixture 84 can be formed to affix to, e.g., grab, retainer edges 74' upon a "quarter twist" of the fixture after it is lowered over retainer faces 72' to seal and hold carrier 85 in between. Fixture 84, carrier 85 and retainer 86 form the apparatus 60, which can be gracefully placed into the analyzer 50. In this embodiment, the sample chamber of the analyzer need not be specially modified, i.e., the sample chamber still accepts a typical sample cell form factor for, e.g., the precedent sample cell 70 of FIG. 5 discussed above. Therefore, the analyzer 50 can be used for its typical purposes, or for highly pressurized liquids, in accordance with the present inventions.

Ports 92 and 94 are also shown from which tubes carrying pressurized sample and/or purged gases are attachable and detachable. The present invention contemplates any of the subcomponents of apparatus 60 to be either consumable (single use), semi-consumable (several uses) or fairly long-lasting (many uses). In an embodiment for LPG, fixture and 84 and retainer 86 may be multi-use, while window carrier 85 may be single use.

Figure 10:
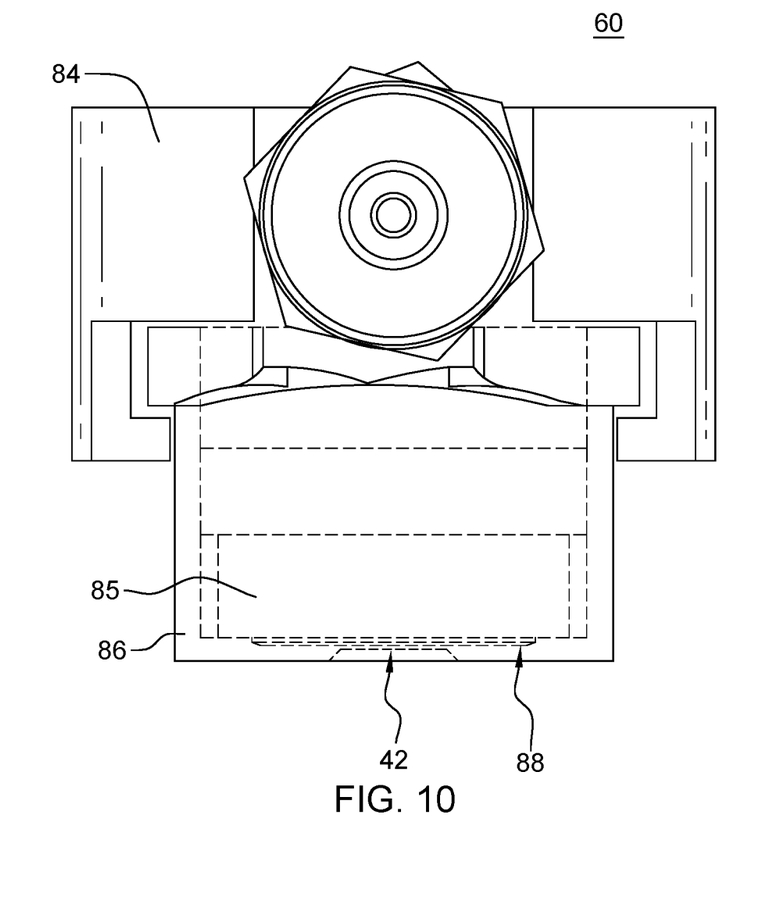
FIG. 10 is a side view of the sample handling apparatus in accordance with one aspect of the present invention.
Figure 11:
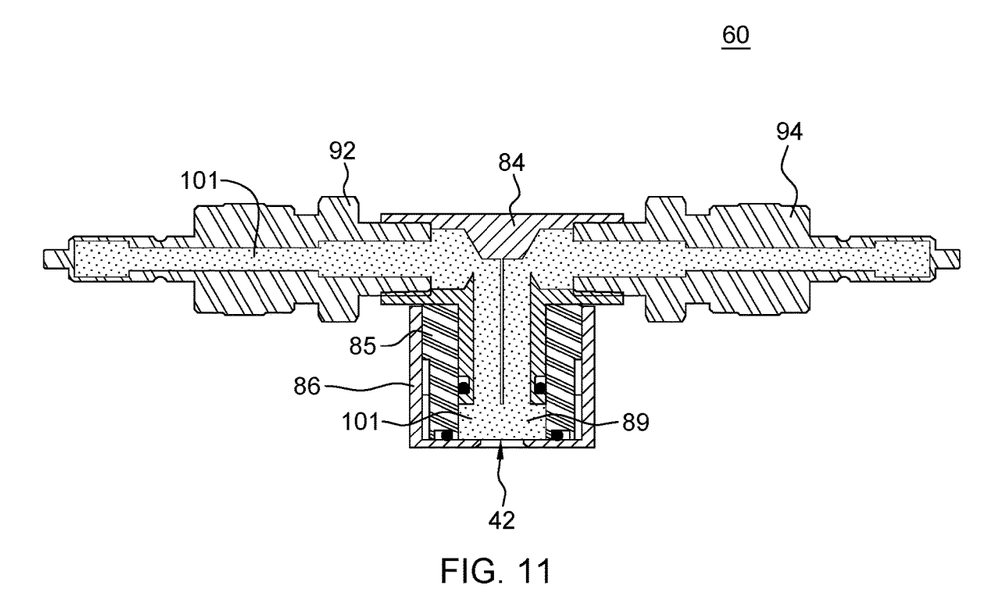
FIG. 11 is a cross-sectional view of the sample handling apparatus in accordance with one aspect of the present invention, charged with sample.

With reference to FIGS. 10 and 11 (where like elements are designated with like numerals from above) shown here is additional internal detail of internal reservoir 89 of carrier 85 which presents charged sample 101 toward the lower, filmed area thereof. The tube structures of fixture 84 open up through apertures facing the sample cell film, so that the sample contacts the film of the carrier 85, thereby presenting the pressurized sample to sample focal area or point 42 (formed by x-ray beams 24 and 26 discussed above) of the exemplary x-ray analyzer.

Apparatus 60 include o-rings gland and/or face seals at the relevant interfaces to ensure pressurized sample stays contained in the apparatus.

Apparatus 60 may also include structures which compensate for varying sample temperature and/or pressure, which provide a predictable, possibly constant, sample temperature and pressure presentation to the analyzer. Examples include pressure-sink (e.g., structural springs) or heat sink structures.

Exemplary analytes measured in accordance with the present invention include: S, Cl, P, K, Ca, V, Mn, Fe, Co, Ni, Cu, Zn, Hg, As, Pb, and/or Se. These are analytes of particular interest for non-homogeneous crude oil.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A sample handling apparatus for a material analyzer, comprising:
   a sample carrier for presenting a pressurized sample to a sample focal area of the analyzer;

a removable fixture for charging the pressurized sample into the sample carrier;

the removable fixture including at least one port to provide sample to and from the fixture and carrier; and a retainer, with the sample carrier being removeably combined with the fixture using the retainer, the retainer engaging the fixture and holding the sample carrier between the fixture and retainer.

2. The sample handling apparatus of claim 1, wherein the apparatus is insertable into the analyzer for sample analysis.

3. The sample handling apparatus of claim 2, wherein the sample carrier includes a sample cell film, and the retainer includes an aperture for presenting the sample to the focal area through the aperture and the sample cell film disposed adjacent to the aperture in the fixture, with the sample carrier being held between the retainer and fixture.

4. The sample handling apparatus of claim 1, in combination with an x-ray analyzer, the x-ray analyzer comprising an x-ray engine including: an x-ray excitation path; and an x-ray detection path; wherein the x-ray excitation and/or the x-ray detection path defines the sample focal area.

5. The combination of claim 4, wherein the focal area is a focal point.

6. The combination of claim 5, wherein the focal point is defined by focused x-rays to/from at least one focusing optic in the x-ray excitation path and/or the x-ray detection path.

7. The combination of claim 6, wherein the at least one focusing optic is at least one curved diffracting optic or polycapillary optic.

8. The combination of claim 6, wherein the at least one focusing optic is at least one focusing monochromatic optic.

9. The combination of claim 8, wherein the at least one focusing monochromatic optic is a curved crystal optic or curved multi-layer optic.

10. The combination of claim 5, wherein at least one focusing optic in the x-ray detection path is positioned such that an input focal point thereof is at the x-ray focal point, and corresponds to an output focal point of at least one focusing optic in the x-ray excitation path.

11. The combination of claim 4, wherein the x-ray analysis system comprises a monochromatic wavelength-enabled XRF analyzer.

12. The combination of claim 11, wherein the analyzer is an MWDXRF or ME-EDXRF analyzer.

13. The apparatus of claim 1, wherein the sample comprises a pressurized petroleum-based product, requiring the measurement of an analyte therein.

14. The apparatus of claim 1, wherein an analyte measured is at least one element chosen from the following list: S, Cl, P, K, Ca, V, Mn, Fe, Co, Ni, Cu, Zn, Hg, As, Pb, and Se.

15. The apparatus of claim 1 wherein the sample is crude oil, and an analyte measured is chlorine.

* * * * *